United States Patent
Panov (10) Patent No.: US 9,284,890 B2
(45) Date of Patent: Mar. 15, 2016

(54) METHOD OF DETERMINING A COMBUSTOR EXIT TEMPERATURE AND METHOD OF CONTROLLING A GAS TURBINE

(75) Inventor: Vili Panov, Lincoln (GB)

(73) Assignee: SIEMENS AKTIENGESELLSCHAFT, München (DE)

(*) Notice: Subject to any disclaimer, the term of this patent is extended or adjusted under 35 U.S.C. 154(b) by 474 days.

(21) Appl. No.: 13/575,972

(22) PCT Filed: Dec. 29, 2010

(86) PCT No.: PCT/EP2010/070853
§ 371 (c)(1),
(2), (4) Date: Jul. 30, 2012

(87) PCT Pub. No.: WO2011/098193
PCT Pub. Date: Aug. 18, 2011

(65) Prior Publication Data
US 2012/0297788 A1 Nov. 29, 2012

(30) Foreign Application Priority Data

Feb. 12, 2010 (EP) .................................... 10153487

(51) Int. Cl.
*F02C 9/28* (2006.01)
*F01D 17/08* (2006.01)
(Continued)

(52) U.S. Cl.
CPC ................ *F02C 9/28* (2013.01); *F01D 17/085* (2013.01); *F01D 21/003* (2013.01); *F23N 1/022* (2013.01); *F23N 5/022* (2013.01); *F23N 5/184* (2013.01); *G01K 7/427* (2013.01); *G01K 13/02* (2013.01); *F05D 2260/80* (2013.01); *F05D 2270/112* (2013.01); *F05D 2270/3032* (2013.01);
(Continued)

(58) Field of Classification Search
None
See application file for complete search history.

(56) References Cited

U.S. PATENT DOCUMENTS 2,809,492 A   10/1957   Arkawy
3,759,037 A    9/1973   Kiscaden
(Continued)

FOREIGN PATENT DOCUMENTS

EP   1746347 A2   1/2007
FR   1523818 A    5/1968
(Continued)

OTHER PUBLICATIONS

Soo Yong Kim and Valeri P. Kovalesky; "Investigation of non-linear numerical mathematical model of a multiple shaft gas turbine unit";, KSME International Journal, vol. 17, No. 12, pp. 2087-2098, 2003.

*Primary Examiner* — William H Rodriguez
*Assistant Examiner* — Scott Walthour (57) ABSTRACT

A method of determining an exit temperature of a gas exiting a combustor of a gas turbine includes determining a mass flow and a temperature of fuel being delivered to the combustor; determining a mass flow and a temperature of air being delivered to the combustor, determining a temperature dependence of the specific heat capacity of a burnt mixture of the fuel and the air being delivered to the combustor; and determining an exit temperature of the burnt mixture exiting the combustor. The exit temperature is determined based on the determined mass flow and temperature of the fuel, the determined mass flow and temperature of the air, and the determined temperature dependence of the specific heat capacity of the burnt mixture.

7 Claims, 4 Drawing Sheets (51) Int. Cl.
*F01D 21/00* (2006.01)
*F23N 1/02* (2006.01)
*F23N 5/02* (2006.01)
*F23N 5/18* (2006.01)
*G01K 7/42* (2006.01)
*G01K 13/02* (2006.01)

(52) U.S. Cl.
CPC ..... *F23N2005/181* (2013.01); *F23N 2005/185* (2013.01); *F23N 2025/06* (2013.01); *F23N 2025/08* (2013.01); *F23N 2041/20* (2013.01); *G01K 2013/024* (2013.01)

(56) References Cited

U.S. PATENT DOCUMENTS

| | | | |
|---|---|---|---|
| 3,797,233 A * | 3/1974 | Webb et al. | 60/791 |
| 4,055,997 A | 11/1977 | Kniat | |
| 4,258,545 A | 3/1981 | Slater | |
| 4,305,129 A * | 12/1981 | Yannone et al. | 700/287 |
| 4,502,043 A | 2/1985 | Moore | |
| 4,809,190 A | 2/1989 | Homer et al. | |
| 5,080,496 A | 1/1992 | Idelchik | |
| 5,097,659 A * | 3/1992 | Lampe et al. | 60/39.27 |
| 5,379,584 A | 1/1995 | Harris | |
| 5,732,556 A | 3/1998 | Schnorr | |
| 6,167,690 B1 | 1/2001 | Wihler | |
| 6,532,745 B1 * | 3/2003 | Neary | 60/784 |
| 6,552,990 B1 | 4/2003 | Ichiura | |
| 7,162,875 B2 | 1/2007 | Fletcher et al. | |
| 2004/0134517 A1* | 7/2004 | Clark | 134/10 |
| 2005/0053537 A1* | 3/2005 | McCollor et al. | 423/244.05 |
| 2006/0005526 A1* | 1/2006 | Tanaka et al. | 60/39.27 |
| 2006/0096292 A1* | 5/2006 | Lilley et al. | 60/772 |

FOREIGN PATENT DOCUMENTS

| | | |
|---|---|---|
| GB | 2011091 A | 7/1979 |
| RU | 2140589 C1 | 10/1999 |
| RU | 2296983 C1 | 4/2007 |
| WO | WO 0017577 A1 | 3/2000 |
| WO | WO 2008068330 A1 | 6/2008 |

\* cited by examiner

METHOD OF DETERMINING A COMBUSTOR EXIT TEMPERATURE AND METHOD OF CONTROLLING A GAS TURBINE

CROSS REFERENCE TO RELATED APPLICATIONS

This application is the US National Stage of International Application No. PCT/EP2010/070853, filed Dec. 29, 2010 and claims the benefit thereof. The International Application claims the benfits of European application No. 10153487.3 EP filed Feb. 12, 2010. All of the applications are incorporated by reference herein in their entirety.

FIELD OF INVENTION

The present invention relates to a method of determining an exit temperature of a gas exiting a combustor of a gas turbine and to a method of controlling a gas turbine. In particular, the present invention relates to a method of determining an exit temperature of a gas exiting a combustor of a gas turbine by modelling the exit temperature based on measured and/or calculated values. Further in particular, the present invention relates to a method of controlling a gas turbine, wherein a modelled combustor exit temperature is integrated over time, wherein the controlling is based on the integration value. In particular, the present invention relates to a method of controlling a gas turbine during transient operation. Further in particular, the present invention relates to a method of controlling a gas turbine for over-temperature protection of components in particular of the turbine section of the gas turbine.

BACKGROUND OF THE INVENTION

A gas turbine engine comprises a compressor section, a combustor section and a turbine section which are arranged in this order. The compressor section may share a common rotor with the turbine section or both sections may comprise individual separated rotors. Alternatively the turbine section may comprise a rotor in a high pressure section and another rotor in a low pressure section. The compressor section is adapted to pressurize air and to deliver the pressurized air to the combustor section further downstream. In the combustor section, or simply combustor, the pressurized air is mixed with fuel and ignited for generating hot combustion gas which flows downstream to and through the turbine section. Thereby, the hot combustion gas drives the turbine section such that its rotor rotates. Thereby, energy contained in the combustion gas in form of pressure and velocity may be converted to mechanical energy which may for example be used for driving a generator to generate electrical energy.

In single shaft arrangements (having a common rotor) high pressure and low pressure parts are mechanically connected such that the turbine section drives the compressor section.

In twin-shaft arrangements (having two separate rotors) the low pressure turbine section is mechanically independent, i.e. drives only the output power shaft, and the high pressure turbine section drives the compressor section.

The turbine section may comprise a high pressure turbine part and a low pressure turbine part which are arranged adjacent to each other so that the low pressure turbine part is arranged downstream of the high pressure turbine part. For conversion of energy of the hot combustion gas the turbine section, in particular the high pressure turbine section, comprises nozzle guide vanes arranged in one or more rows, wherein each row is arranged in a particular axial position with respect to the rotor whose rotation axis runs along the axial direction. A turbine section may comprise one or more rows of nozzle guide vanes which are spaced apart in an axial direction. The rows of nozzle guide vanes belong to a stator part of the gas turbine and do not move during operation of the gas turbine.

Downstream of a row of nozzle guide vanes a row of rotor blades is arranged which are connected to the rotor shaft and rotate upon impingement of the hot combustion gas to their blade surfaces. The row of nozzle guide vanes upstream of the row of rotor blades are adapted to appropriately guide the hot combustion gas towards the rotor blades for optimizing the conversion of energy. Thereby, the nozzle guide vanes are subjected to especially high temperatures due to the hot combustion gas contacting the nozzle guide vanes and transferring thermal energy to the nozzle guide vanes. In particular, the nozzle guide vanes are considered to be the most critical components of the turbine section regarding thermal stress.

Hot combustion gases and the combustor exhaust can reach very high temperatures (above 1500° C.), in particular under transient operation conditions. Thereby, transient operation conditions may be operation conditions of the gas turbine, in which a gas turbine load is changing with time, in which fuel supply is changing with time and/or in which air supply to the combustor is changing with time, in particular very rapidly. In particular, transient operation conditions are different from steady state conditions.

The hot combustion gases may heat up the outer surface portion of the nozzle guide vane, while the nozzle guide vane may internally be cooled by for example air delivered from the compressor or steam delivered from a heat recovery system. Thereby, a steep temperature gradient may result between the inner and the outer portions of the nozzle guide vane. Thereby, the guide vane is strained to a high degree and may be the most likely engine component to fail, wherein this failure is primarily due to low cycle fatigue.

Thus, the temperature of the combustion gas to which the guide vanes are subjected must be limited in order to avoid damage of the nozzle guide vanes.

On the other hand gas turbine engines are inherently designed to operate at high gas temperatures, thereby improving their cycle efficiency. Thus, it is desired to operate a gas turbine at the maximum allowable temperature tolerable for the components, such as the nozzle guide vanes. Subjecting the components to a temperature above these limits may lead to permanent damage of these components. For example, a small increase of a guide vane temperature may reduce the service life by a substantial amount. To prevent turbine damage induced by excessive, prolonged combustor outlet gas temperature, the engine may be operated at a turbine peak temperature that is several degrees below the vanes critical lifecycle fatigue temperature. In conventional systems the turbine component may be protected by controlling engine operations parameters. Thereby, controlling may be based on a gas temperature measured at a point of the turbine section downstream of the first row of nozzle guide vanes.

The temperature of the combustion gases at the inlet of the high pressure turbine section may be too high to be measured directly, which presents problems in appropriately controlling the gas turbine.

The combustor exit temperature may also be referred to as turbine entry temperature. It may conventionally be controlled by for example limiting fuel flow delivered to the combustor. It may be derived or estimated from a temperature of the hot gases downstream of one or more turbine sections after energy has been extracted from the hot gas and the gas temperature. This temperature further downstream may correspondingly be reduced to a suitable level which may be practically measured.

Thereby, the combustion gas temperature may be measured by a plurality of thermocouples disposed either at the outlet of the turbine section or between a high pressure and a low pressure turbine section. In any case it is currently not possible to accurately measure the temperature of the combustion gas exiting the combustor. Thereby, appropriately protecting components of the turbine sections may be difficult.

While in a steady state operation condition the gas temperature measured further downstream the first row of nozzle guide vanes may appropriately be used for estimating the actual combustor exited temperature, this may be difficult during transient operation. In particular, during engine transients each engine acceleration and/or deceleration may induce a cycle of thermal stress especially to the nozzle guide vanes. Further, during these transients the actual combustor exit temperature may not be appropriately estimated based on temperature measurements further downstream. Especially during these transients the nozzle guide vane may be subjected to temperatures exceeding their limiting temperatures.

In particular, the temperature of the gas measured downstream the first row of nozzle guide vanes may not reflect the true combustor exit temperature, because the thermocouple used for measurements probing at the turbine exit may be constructed for accuracy and durability but not for quick response. Thereby, the thermocouple probe construction may result in a lag with a relatively slow response as compared to that of the critical turbine hardware. Using a gas turbine engine capable of full load acceptance in just over a couple of seconds the transient combustion gas temperature may quickly increase. Although consideration of this temperature lag may not be critical for engine accelerations of long duration, the delay may become most significant when attempting to accurately compensate for thermocouple dynamics during rapid accelerations of short duration.

Document U.S. Pat. No. 6,167,690 discloses a control system, wherein a turbine inlet temperature is derived as a function of a turbine outlet temperature.

The document "Investigation of non-linear numerical mathematical model of a multiple shaft gas turbine unit", by SooYong Kim and Valeri P. Kovalesky, KSME International Journal, Volume 17, No. 12, pages 2087-2098, 2003, discloses a mathematical model to calculate characteristics of a multi-shaft gas turbine, wherein energy balances are applied.

There may be a need for a method of determining an exit temperature of a combustor of a gas turbine. Further, there may be a need for a method of controlling a gas turbine, in order to operate the gas turbine in the highest possible temperature range without deteriorating or damaging components of the gas turbine. In particular, there may be a need for a method of controlling a gas turbine, when the gas turbine is operated under temporary changing, i.e. transient, operation conditions.

SUMMARY OF THE INVENTION

According to an aspect, a method of determining an exit temperature of a gas exiting a combustor of a gas turbine is provided, wherein the method comprises determining a mass flow and a temperature of fuel being delivered to the combustor; determining a mass flow and a temperature of air being delivered to the combustor; determining a temperature dependence of the specific heat capacity of a burnt mixture of the fuel and the air being delivered to the combustor; and determining an exit temperature of the burnt mixture exiting the combustor based on the determined mass flow and temperature of the fuel, the determined mass flow and temperature of the air, and the determined temperature dependence of the specific heat capacity of the burnt mixture.

The method may apply a balance of energy which is supplied to the combustor and which is discharged from the combustor. In particular, the method may apply determining of energy per time supplied to the combustor and determining energy per time discharged from the combustor. In particular, the energy supplied to the combustor may change with time by supplying air and/or fuel to the combustor having a particular mass flow, temperature and specific heat capacity. Further, burning the mixture of fuel and air within the combustor may result in a heat of combustion, which may be derived from a mass flow of the fuel, the lower heating value (LHV) or lower calorific value (LCV), and an efficiency of the combustor. Similarly, the energy per time discharged from the combustor may be determined from a mass flow, temperature and specific heat capacity of the burnt mixture (such as the combustion gas) of the gas and the fuel being burnt in the combustor. Applying the law of conservation of energy the temperature of the burnt mixture of fuel and air, i.e. the combustor exit temperature (CET), may be derived.

In particular it may be advantageous to take a temperature dependence of the specific heat capacity of the burnt mixture into account to accurately determine the exit temperature of the burnt mixture, i.e. the combustor exit temperature. The method may comprise measuring and/or calculating different required values. For example, one or more temperatures at one or more different positions within the gas turbine may be measured by using for example one or more thermocouples. Further, one or more pressure values may be measured at one or more positions within the gas turbine. Further, some required values may be approximated and/or computationally obtained by applying balance equations or fundamental physical laws.

In particular, it may not be necessary to measure a temperature of the combustion gas close to a position of an exit of the combustor or close to the first row of guide vanes. Further, the combustor exit temperature may by determined for rapidly changing operation conditions of the gas turbine. Further, the determined exit temperature of the burnt mixture exiting the combustor may reflect rapid changes in the operation conditions of the gas turbine, such as for example during rapid load changes or start-up of the gas turbine.

According to an embodiment, the determining the temperature dependence of the specific heat capacity of the burnt mixture comprises approximating the specific heat capacity, in particular by a polynomial of the temperature. In other embodiments the specific heat capacity of the burnt mixture may be approximated by other functions dependent on the temperature, such as a linear function, a quadratic function, a cubic function, an exponential function and a combination of the former or other functions. An approximation of the specific heat capacity of the burnt mixture by a polynomial of the temperature may be particularly simple, since it may involve a Taylor expansion or series of the specific heat capacity. Further, coefficients of the polynomial may be available for a number of substances representing the burnt mixture of fuel and air exiting the combustor.

According to an embodiment, determining the exit temperature comprises establishing an iteration equation and applying the iteration equation to at least a predetermined start exit temperature. Based on a previous value of the exit temperature the iteration equation may allow calculating a subsequent exit temperature which may be more accurate than the previous exit temperature. Iteratively applying the iteration equation may result in a sequence of exit temperatures more and more closely resembling the exact combustor exit temperature. Thereby, an accuracy of the determined combustor exit temperature may be monitored by considering a difference between a subsequent exit temperature and a previous exit temperature. Upon convergence (applying the iteration equation a sufficient number of times, such as 2 times, 5 times, 10 times, 20 times, 100 times, or more) this difference may approach zero. Due to time consuming calculations and due to computational hardware limitations application of a large number of iterations may not be necessary or reasonable at the moment. Further, required accuracy may vary depending on the application and may not necessitate to apply the iteration equation a large number of times such that application of 20 times, 10 times, 5 times or 2 time may be sufficient.

According to an embodiment, determining the exit temperature further comprises defining a threshold and iteratively applying the iteration equation to repeatedly obtain a subsequent exit temperature from a previous exit temperature, wherein the iteratively applying the iteration equation is stopped, if the difference between the subsequent exit temperature and the previous exit temperature is smaller than the threshold, wherein the obtained subsequent exit temperature is determined as the exit temperature.

Thereby, it may be monitored how much the subsequent exit temperature deviates from the previous exit temperature, to monitor the accuracy of the determined combustor exit temperature. In particular, for a higher desired accuracy of the combustor exit temperature a higher number of iteration cycles may be performed. Otherwise, if only a low accuracy of the combustor exit temperature is required, the iteration equation may be applied only a few times, such as one time, two times, three times, four times, or five times. The number of iterations applied may depend on a particular application and also on the construction of the gas turbine, in particular the construction of the combustor.

According to an embodiment, the determining the mass flow and the temperature of the fuel delivered to the combustor comprises detecting a state of a valve controlling delivering the fuel to the combustor; and/or measuring the temperature of the fuel. In particular, the determining the mass flow of the fuel may comprise detecting a state of a valve controlling delivering the fuel to the combustor. In an embodiment mass flow of the fuel may be determined by Fuel Flow DEMand (FFDEM), which may be a value determined by control system. In an embodiment the determining the mass flow of the fuel may comprise controlling the state of a valve controlling delivering the fuel to the combustor. In an embodiment, the determining the temperature of the fuel delivered to the combustor may comprise measuring the temperature of the fuel.

Further, determining the mass flow of the fuel delivered to the combustor may comprise measuring the mass flow of the fuel delivered to the combustor and/or controlling the mass flow of the fuel delivered to the combustor using for example a valve controlling delivering the fuel to the combustor. Further, the determining the temperature of the fuel may comprise setting or assuming the temperature of the fuel to be an ambient temperature. Thereby, the temperature of the fuel must not necessarily be measured, but may also be estimated based on other temperature values which are available.

Thereby, the mass flow and the temperature of the fuel delivered to the combustor may easily be determined.

According to an embodiment, determining the temperature of the air comprises measuring the temperature of the air delivered to the combustor. This may increase the accuracy of the method. In another embodiment the temperature of the air may also be estimated based on other measured temperatures available.

According to an embodiment determining the mass flow of the air comprises applying a mass conservation relation between the mass flow of the burnt mixture, the mass flow of the fuel delivered to the combustor and the mass flow of the air. In particular, the mass flow of the burnt mixture may be determined, the mass flow of the fuel delivered to the combustor may be determined and the mass flow of the air may be determined based on the determined mass flow of the burnt mixture and the determined mass flow of the fuel. Thereby, it may not be necessary to measure or otherwise estimate the mass flow of the air to the combustor. The mass flow of the burnt mixture may either be measured or estimated/calculated from other values available. Further, the mass flow of the fuel delivered to the combustor may either be measured and/or calculated/estimated from other known values. Thereby, the determining the mass flow of the air may be simplified, requiring less measurements.

According to an embodiment, determining the mass flow of the burnt mixture comprises measuring a pressure of air at an compressor exit delivering air to the combustor; calculating an approximated temperature of the burnt mixture based on measured temperature values; and determining the mass flow of the burnt mixture based on the measured pressure and the calculated temperature of the burnt mixture.

The compressor may be comprised in the gas turbine and may in particular be arranged upstream of the combustor, wherein the combustion gas exiting the combustor and flowing to the turbine may define a flow direction from upstream to downstream. The approximated temperature of the burnt mixture may represent a temperature of an inlet of the turbine section (TIT) and may also represent an approximated combustor exit temperature.

This approximated temperature of the burnt mixture may for example be calculated or estimated based on a thermodynamic mean interduct temperature, a mean compressor exit temperature, a mean compressor inlet temperature and a constant dependent on the fuel type. Thereby, the thermodynamic mean interduct temperature may be a temperature measured at a location between the compressor turbine section (high pressure turbine section which drives the compressor) and the low pressure turbine section downstream of a high pressure turbine section which may be the power turbine section or a low pressure turbine section which drives a compressor. The mean compressor exit temperature may be a temperature of the air at an exit of the compressor immediately upstream of the combustor. The mean compressor inlet temperature may be a temperature of air at an inlet of the compressor. The constant dependent on the fuel type may be dimensionless and may amount to 1.182 for a gas fuel and may amount to 1.210 for a liquid fuel, but this constant may assume different values for different types of fuel. The constant dependent on the fuel type may be greater for a gas fuel than for a liquid fuel.

According to an aspect a method of controlling a gas turbine is provided, wherein the method comprises determining a combustor exit temperature of a gas exiting a combustor of the gas turbine, in particular according to the method described above; guiding the gas exiting the combustor to a turbine section of the gas turbine; and controlling the gas turbine based on the determined combustor exit temperature.

Compared to conventional methods the method of controlling a gas turbine may allow more effectively prohibiting damage of components of the gas turbine, in particular components of the turbine section. In conventional methods it may not have been possible to accurately determine the temperature of the gas exiting the combustor. Thus, detecting a gas temperature critical for components of the turbine section may not have been possible. Since according to an aspect of the present invention the combustor exit temperature of combustion gas exiting the combustor may be more accurately determined, also controlling a gas turbine in order to prevent damage of components of the gas turbine may be improved.

According to an embodiment, the method of controlling a gas turbine further comprises integrating a first difference between the determined combustor exit temperature and a predetermined threshold temperature over a time interval, if the first difference is greater than zero, wherein the controlling the gas turbine is based on a value of the integrated first difference. The predetermined threshold temperature may be a temperature limit which must not be exceeded without damaging components of the turbine section of the gas turbine, in particular a first row of nozzle guide vanes. The integration may be performed only if the determined combustor exit temperature exceeds the predetermined threshold temperature.

Components of the turbine section of the gas turbine may be at an increased risk of damage when increasing the value of the integrated first difference. The higher the value of the integrated first difference may be, the more the components of the turbine section may be at risk of damage. It may be tolerable for the components of the turbine section when the determined combustor exit temperature exceeds the threshold temperature only for a short time interval, such as 5 seconds, 10 seconds, 30 seconds, or 60 seconds, but it may not be tolerable when this time interval is greater than 5 seconds, 10 seconds, 30 seconds, 60 seconds, or even greater.

By using the integral value heat conduction properties of the components of the turbine section may be taken into account.

According to an embodiment, the method of controlling a gas turbine further comprises cooling the turbine section with a cooling fluid having a cooling fluid temperature; and integrating a second difference ($\Delta T$) between the determined combustor exit temperature and a sum of the cooling fluid temperature and a difference threshold ($\Delta T\_lim$) over a time interval, if the second difference is greater than zero, wherein the controlling the gas turbine is based on a value of the integrated second difference.

In particular, the cooling the turbine section may be performed by using pressurized air delivered by the compressor as the cooling fluid. The cooling air may have a temperature between 300 and 600°, for example, but may be considerably lower than a temperature of the combustion gas exiting the combustor, i.e. the combustor exit temperature, which may amount to between 900 and 1.600° C., as an example. While cooling the turbine section the components comprised therein may be subjected to a temperature lower than the combustor exit temperature, such as approximately the combustor exit temperature decreased by the cooling fluid temperature. Only portions of the difference between the determined combustor exit temperature and the cooling fluid temperature which portions exceed the difference threshold will contribute to the value of the integrated second difference. Alternatively the value of the integrated second difference may be obtained by integrating the determined combustor exit temperature over a time interval only for those portions of the determined combustor exit temperature which lie above a sum of the cooling fluid temperature and the difference threshold to obtain an integral value and then subtracting from the obtained integral value the product of the time interval and the sum of the cooling fluid temperature and the difference threshold.

According to an embodiment, the method of controlling a gas turbine further comprises reducing delivering the fuel and/or delivering the air to the combustor, if the value of the integrated first difference is greater than a first threshold and/or the value of the integrated second difference is greater than a second threshold. According to an embodiment the gas turbine may be shutdown as a protective action, if the value of the integrated first difference is greater than a first threshold and/or the value of the integrated second difference is greater than a second threshold.

Thereby, an area (with units: degree Celsius times seconds) represented by the integrated first difference and/or integrated second difference may be used and is a criterion when and/or to which degree delivering the fuel and/or the air to the combustor should be reduced or increased. This new criterion may be more appropriate for protecting the components of the turbine section than conventional criteria only involving a threshold temperature without considering a time duration during which the component of the turbine is subjected to a temperature exceeding the threshold temperature. Thereby, the gas turbine may be operated at temperatures providing higher efficiency, while their components are efficiently protected against damaging temperatures.

According to an embodiment, the method of controlling the gas turbine further comprises maintaining delivering the fuel and/or delivering the air to the combustor at an uncorrected rate, when the value of the integrated first difference is smaller than or equal to the first threshold and/or the value of the integrated second difference is smaller than or equal to the second threshold, wherein the determined combustor exit temperature is greater than the predetermined threshold temperature. Thereby, although the determined combustor exit temperature exceeds the predetermined threshold temperature (which may cause damage to the components of the turbine when prevailing for a sufficiently long time), operation of the gas turbine is not interrupted or reduced, since the time duration for which the damaging temperature prevails is not yet high enough to actually cause damage to the turbine components. Thereby, a utilization or efficiency of the gas turbine may be improved.

According to an aspect, a control unit for controlling a gas turbine is provided, wherein the control unit is adapted to control and/or carry out the method of controlling a gas turbine as set forth above.

According to an aspect, a computer program product is provided, which is adapted to control and/or carry out the method of determining an exit temperature of a gas exiting a combustor of a gas turbine, as set forth above.

It has to be noted that embodiments of the invention have been described with reference to different subject matters. In particular, some embodiments have been described with reference to method type claims, whereas other embodiments have been described with reference to apparatus type claims. However, a person skilled in the art will gather from the above and the following description that, unless otherwise notified, in addition to any combination of features belonging to one type of subject matter also any combination between features relating to different subject matters, in particular between features of the method type claims, and features of the apparatus type claims, is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment, but to which the invention is not limited.

Embodiments of the present invention are now described with reference to the accompanying drawings.

DETAILED DESCRIPTION

Conventional methods frequently rely on a turbine operating temperature (Top) for controlling the gas turbine. In case of an industrial turbine engine the Limiting Temperature may be represented by $T_{op}$ Turbine Operating Temperature.

Figure 5A:
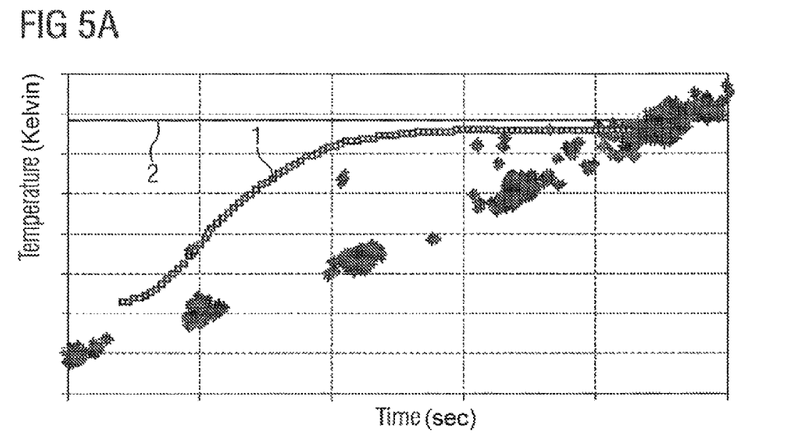
FIGS. 5a and 5b illustrate graphs of temperatures in a gas turbine.

FIG. 5a shows comparison of $T_{op}$ profile during rapid full load acceptance and full engine loading of long duration, wherein the time dependence of the operating temperature is plotted as curve 1, wherein $T_{op}$ is calculated as:

$$T_{OP} = T_{pte} - T_{in} + K_{T_{op}}(T_{in} - T_{amb})$$

where $T_{pte}$ is average power turbine exit temperature, $T_{in}$ is average inlet temperature, $T_{amb}$ ambient reference temperature and $K_{T_{op}}$ is constant dependant on the fuel type. Indicated as curve 2 is the limiting operating temperature (TLT) which must not be exceeded during operating the gas turbine.

Figure 5B:
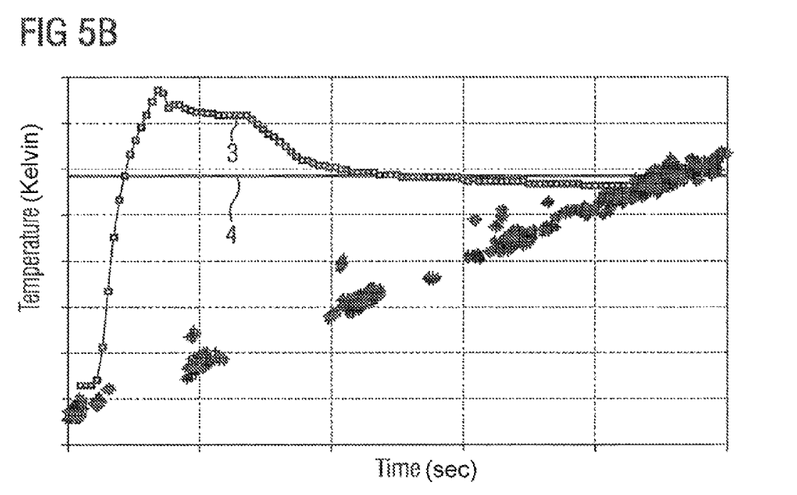

FIG. 5b shows the same full load acceptance test as shown in FIG. 5a, wherein in FIG. 5b the turbine entry temperature TET (indicated as curve 3) is compared for rapid and slow transient.

The FIGS. 5a and 5b show that the peak TET temperature 3 is reached much before maximum $T_{op}$ is reached. It can be also observed that even the operating temperature Top does not reach TLT, and TET may be significantly above equivalent TET limit indicated as curve 4.

The $T_{op}$ (curve 1 in FIG. 5a) may not reflect the true critical temperature, because the thermocouple probes at the turbine exit may be constructed for accuracy and durability, not quick response. Although consideration of this signal lag may not be critical for engine accelerations of long duration, the lag may become most significant when attempting to accurately compensate for thermocouple dynamics during rapid accelerations of short duration. In order to mitigate this problem additional temperature limiting control parameter will be proposed in this application, which may adequately reflect true critical turbine temperature during rapid engine transients.

Transient Turbine Entry Temperature—CET Calculation

In order to determine the combustor exit temperature CET (temperature of a burnt mixture of fuel and air exiting the combustor), in particular the transient CET, conservation balance of energy for combustion chamber may be utilized in equation (1), as follows:

$$Cp_{air}T_{air}\dot{m}_{air} + Cp_{fuel}T_{fuel}\dot{m}_{fuel} + \eta_{comb}LCV\dot{m}_{fuel} = Cp_{comb}CET\dot{m}_{comb} \quad \text{eq. (1)}$$

Therein, $\dot{m}_{air}$ is the mass flow of the air delivered to the combustor;

$\dot{m}_{fuel}$ is the mass flow of the fuel delivered to the combustor;

$T_{air}$ is the temperature of the air delivered to the combustor;

$T_{fuel}$ is the temperature of the fuel delivered to the combustor;

$\eta_{comb}$ is the efficiency of the combustor which may depend on CET and the fuel type;

LCV is the lower calorific value, sometimes also called lower heating value (LHV) or net calorific value of a fuel which is defined as the amount of heat released by combusting a specified quantity (initially at 25° C. or another reference state) and returning the temperature of the combustion products to 150° C., as an example. Therefore, LHV assumes all the water component is in vapour state at the end of combustion (in product of combustion), as opposed to higher heating value (HHV) that assumes all the water component in liquid form of the combustion gas; LCV may depend on the fuel type;

$Cp_{air}$, $Cp_{fuel}$, $Cp_{comb}$ are the specific heat capacities of the air and the fuel delivered to the combustor, and the specific heat capacity of the burnt mixture of the air and the fuel, respectively; and $\dot{m}_{comb}$ is the mass flow of the burnt mixture of fuel and air exiting the combustor.

One may calculate transient CET using the following iterative equation (2):

$$\text{WHILE } CET^i - CET^{i-1} > CET^{err} \quad \text{eq. (2)}$$

$$CET^i = \frac{\left[\begin{array}{c} Cp_{air}(T_{air})T_{air}\dot{m}_{air} + Cp_{fuel}(T_{fuel})T_{fuel}\dot{m}_{fuel} + \\ \eta_{comb}(CET^{i-1})LCV\dot{m}_{fuel} \end{array}\right]}{Cp_{comb}(CET^{i-1})\dot{m}_{comb}}$$

where superscript i represents a current iteration and i−1 a previous iteration step.

Figure 1:
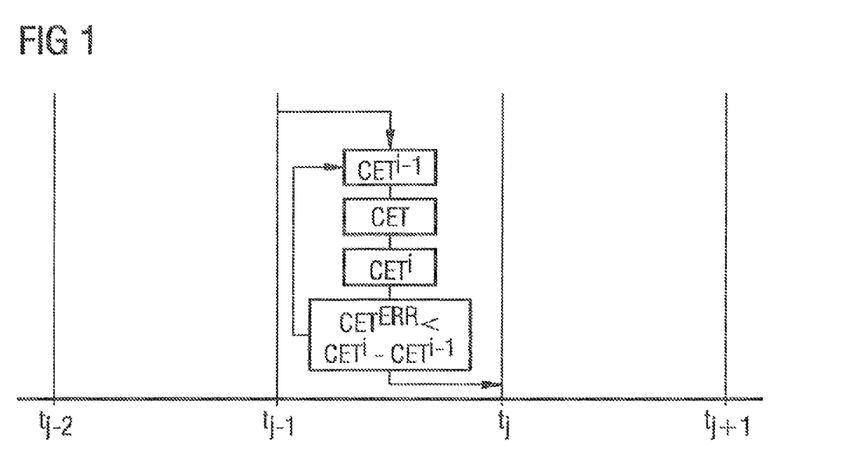
FIG. 1 schematically shows a flow diagram according to an embodiment.

The iterative method for determining the combustor exit temperature CET is illustrated in FIG. 1, wherein $t_j$ represents current time step, and $t_{j-1}$ is previous time step.

In above equation (2) the following measured variables may be used:

$T_{in}$—Mean Compressor Inlet Temperature to represent fuel temperature $T_{fuel}$=Tin.

$T_{cd}$—Mean Compressor Delivery Temperature to represent air temperature $T_{air}$=Tcd For prediction of CET according to eq. (1) and (2) the following non-measured variables may be calculated: approximated turbine inlet temperature (TIT), combustion mass flow, fuel mass flow, air mass flow, combustion efficiency and specific heat for three different gas compositions.

The approximated Turbine inlet temperature TIT may be calculated from measured temperatures as follows:

$$TIT = T_{t\,int} + K_{TIT}(T_{cd} - T_{in}) \quad \text{eq. (3)}$$

wherein $T_{t\,int}$ is the thermodynamic mean interduct temperature, measured in an interduct between a compressor turbine section (high pressure turbine section) and the power turbine section (low pressure turbine section);

$T_{cd}$ is the mean compressor exit temperature;

$T_{in}$ is the mean compressor inlet temperature; and $K_{TIT}$ is a constant dependant on the fuel type.

The Combustor mass flow may be calculated as follows:

$$\dot{m}_{comb} = K_{\dot{m}_{comb}} \frac{P_{cd}}{\sqrt{TIT}} \quad \text{eq. (4)}$$

wherein $P_{cd}$ is the measured compressor exit pressure;

TIT is the turbine inlet temperature according to eq. (3); and $K_{\dot{m}_{comb}}$ is a constant dependant on the fuel type.

FIG. 1 illustrates the determination of the combustor exit temperature (CET) according to an embodiment. For initiations a start exit temperature is provided, i.e. $CET^0$. By inserting the start exit temperature $CET^0$ as a previous exit temperature into equation (2) a subsequent exit temperature $CET^1$ may be obtained. Thereupon, it is checked whether the condition $CET^{ERR} > |CET^1 - CET^0|$ is satisfied. If this condition is not satisfied the exit temperature $CET^1$ is again inserted into equation (2) to obtain an exit temperature $CET^2$. This procedure is repeated, until the above condition is fulfilled. The exit temperature is then taken as the last exit temperature in the sequence of exit temperatures.

Figure 2:
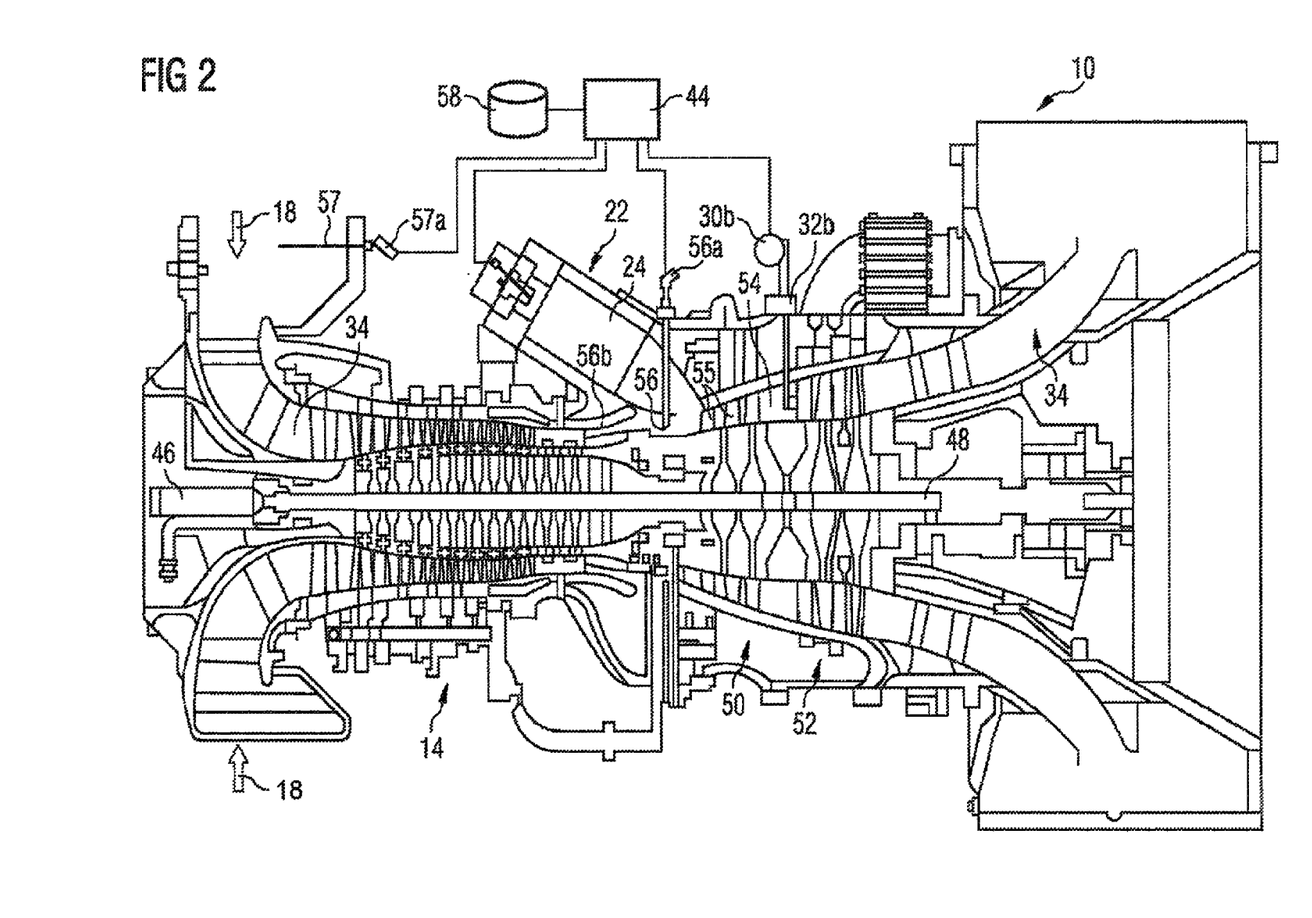
FIG. 2 schematically illustrates a gas turbine comprising a control unit for controlling the gas turbine according to an embodiment.

FIG. 2 schematically illustrates a gas turbine 10 having a control unit 44 for controlling the gas turbine 10. The turbine 10 is a so-called twin-shaft engine having a first rotor shaft 46 and a second rotor shaft 48, which are independent from each other, wherein the rotor shaft 46 extends from the compressor section 14 to the high pressure turbine section 50, whereas the rotor shaft 48 only belongs to the low pressure turbine section 52.

Air 18 is introduced into the compressor section 14 along an air duct 34 and is compressed by the compressor section 14 and supplied to a combustor section 22. The combustor section 22 comprises annularly arranged combustors 24 of which only one is illustrated in FIG. 2. The pressurized air is mixed with fuel and burnt. The burnt mixture of air and fuel is then supplied to the high pressure turbine section 50 to impinge upon guide vanes 55 and rotor blades to drive the rotor shaft 46.

At a position 56 the gas turbine comprises a thermocouple probe to measure a temperature of the pressurized air exiting the compressor section 14 using thermocouple 56a. Also, at or close to this position the gas turbine comprises a pressure measuring device 56b to measure the pressure of the pressurized air exiting the compressor section 14. At a location 57 the gas turbine 10 comprises a thermocouple probe to measure the temperature of the air 18 entering the compressor section 14 via thermocouple 57a. At a location close to or within the interduct 54 the gas turbine comprises one or more probing points 32b of one or more thermocouples 30b to measure the temperature of the gas at the interduct 54.

The control unit 44 is adapted to read in the temperature and pressure values measured at the positions 32b, at position 56, at position 56b and at position 57 and process these temperature and pressure values to derive a combustion exit temperature (CET) as will be described in more detail below. Based on the determined combustor exit temperature (CET) the control unit 44 controls the delivery of fuel and/or air delivered to the combustor 24, to control the gas turbine 10. For this purpose, the control unit 44 comprises a storage 58, in which a computer program is stored which is adapted to determine the combustor exit temperature from the above-mentioned temperature and pressure values and further parameters of the gas turbine.

Thereby it is enabled to compute Combustor mass flow according to equation (4) above.

The fuel mass flow may be constrained by the dynamics of the fuel valve, which may be represented by a first-order non-periodic system:

$$\tau_{fv}\frac{d\dot{m}_{fuel}}{dt} + \dot{m}_{fuel} = \frac{FFDEM}{LCV} \Rightarrow \frac{d\dot{m}_{fuel}}{dt} = \frac{1}{\tau_{fv}}\left(\frac{FFDEM}{LCV} - \dot{m}_{fuel}\right) \quad \text{eq. (5)}$$

wherein

FFDEM is the control system fuel flow demand;

$\tau_{fv}$ is a fuel valve time constant; and

LCV is the lower calorific value as defined above.

The air mass flow may be found by applying conservation balance of total mass for combustion chamber:

$$\dot{m}_{air} = \dot{m}_{comb} - \dot{m}_{fuel} \quad \text{eq. (6)}$$

The combustion efficiency may be a function of the combustor exit temperature:

$$\eta_{comb} = f(CET) \quad \text{eq. (7)}$$

The functional relationship may be derived from Combustion efficiency data generated from factory test data based on the difference between the measured fuel flow and the fuel flow derived from an energy balance. Examples for combustion efficiency for a gas fuel are given in Table 1, wherein the combustor exit temperature (CET) is given in ° K.

TABLE 1

| | CET [K] | | | | |
|---|---|---|---|---|---|
| | 800 | 1000 | 1200 | 1400 | 1600 |
| $\eta_{comb}$ | 0.169 | 0.633 | 0.885 | 0.986 | 1.000 |

Three gas compositions may be used, two for air and natural gas prior to the combustors, and a third for combustion products. In each case the specific heat capacities of the gases may be characterised as functions of gas temperature by means of polynomial equations. Specific heat capacity at constant pressure may be characterized by a $4^{th}$ order polynomial according to the following equation:

$$C_p = C_{p1}(C_{p2}T^4 + C_{p3}T^3 + C_{p4}T^2 + C_{p5}T + C_{p6}) \quad \text{eq. (8)}$$

Examples of polynomial coefficients in equation (8) from which the specific heat can be calculated are given in Table 2. In other embodiments these coefficients may assume different values which may for example experimentally be determined.

TABLE 2

| | Air | Hot Gas | Gas Fuel |
|---|---|---|---|
| $C_{p1}$ [J/kgK] | 1000 | 1000 | 1000 |
| $C_{p2}$ [1/K⁴] | $9.1483 \times 10^{-14}$ | $8.8523 \times 10^{-14}$ | $6.3870 \times 10^{-11}$ |
| $C_{p3}$ [1/K³] | $-4.5693 \times 10^{-10}$ | $-4.4083 \times 10^{-10}$ | $-1.26445 \times 10^{-7}$ |
| $C_{p4}$ [1/K²] | $7.2934 \times 10^{-7}$ | $6.9107 \times 10^{-7}$ | $9.3529 \times 10^{-5}$ |
| $C_{p5}$ [1/K] | $-2.4988 \times 10^{-4}$ | $-1.8100 \times 10^{-4}$ | $-2.7520 \times 10^{-2}$ |
| $C_{p6}$ [ ] | 1.0254 | 1.0453 | 4.9538 |

By applying equation (8) the specific heat capacities of the air, the fuel and the burnt mixture of the fuel and the air occurring in eq. (1) and (2) may be derived.

Thus, based on equations (1) and (2) the combustor exit temperature (CET) of the gas exiting the combustor may be determined. According to an embodiment the thus determined combustor exit temperature (CET) is utilized in a method of controlling a gas turbine.

Figure 3:
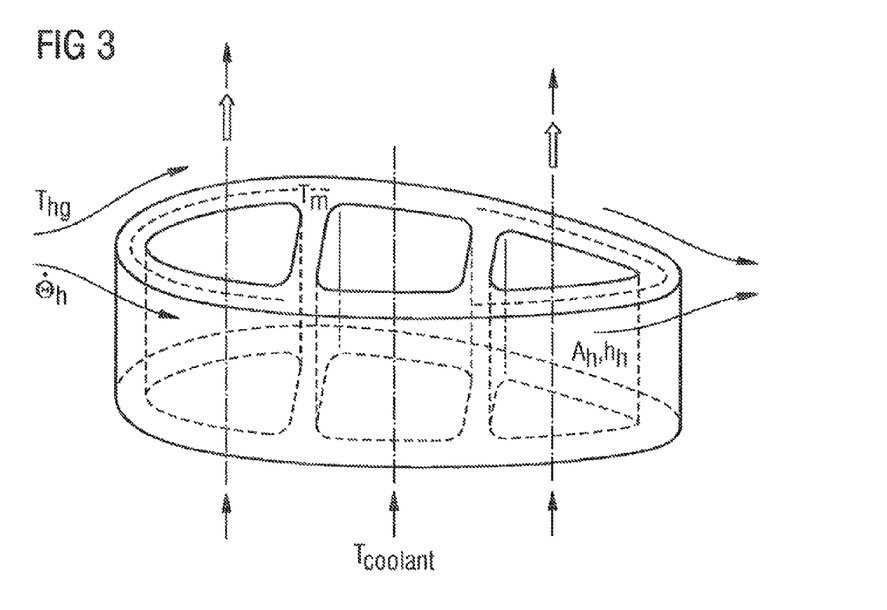
FIG. 3 schematically illustrates a component of a gas turbine which is protected against thermal damage by a method of controlling a gas turbine according to an embodiment.

Transient Turbine Over-Temperature Protection:

Two distinct mechanisms of heat transfer to components of the turbine section of the gas turbine may be recognized in the cooled turbine configuration. The heat transfer analysis for cooled blades (such as guide vanes) is schematically shown in FIG. 3. In considering cooled turbine blade, it can be seen that the hot gas transfers certain amounts of thermal energy flow or heat flow to the blade. To maintain a desired blade temperature, the cooling mass flow through the blade internal channels may remove or diminish heat from the blade.

A proposed transient over-temperature control parameter may be based on permissible thermal load to which turbine is subjected during rapid transients.

Referring to FIG. 3, turbine thermal load may be derived from heat flow that is transferred from hot gas to metal $\dot{\theta}_h$ of a component of the turbine section downstream the combustor, and may be defined as follows:

$$\dot{\theta}_h = h_h A_h (T_{hg} - T_m) \quad \text{eq. (9)}$$

where:
 $h_h$ is averaged heat transfer coefficient for hot side,
 $A_h$ is contact surface for hot side,
 $T_{hg}$ is hot gas temperature
 $T_m$ is metal temperature
Introducing an expression for cooling effectiveness:

$$C_{eff} = \frac{T_{hg} - T_m}{T_{hg} - T_{coolant}} \quad \text{eq. (10)}$$

into the expression for heat flow in eq. (9) one may obtain the following relation:

$$\frac{d\theta_h}{dt} = h_h A_h C_{eff} (T_{hg} - T_{coolant}) \quad \text{eq. (11)}$$

where $T_{coolant}$ is the temperature of a coolant, such as compressor delivered air.

Heat transferred from hot gas exiting the combustor and entering the turbine section to metal of the turbine component (such as a guide vane, a rotor blade and the like) can be found by integrating above equation (11):

$$\theta_h = \int h_h A_h C_{eff} (T_{hg} - T_{coolant}) dt \quad \text{eq. (12)}$$

Substituting hot gas temperature with turbine entry temperature (TET) which equals the combustor exit temperature $T_{hg}=CET=TET$, substituting coolant temperature with compressor discharge temperature $T_{coolant}=Tcd$, and assuming that heat transfer coefficient $h_h$ and cooling effectiveness $C_{eff}$ are constant during engine transients for the conditions above nominal turbine entry temperature TET lim, it is possible to write following relation:

$$\theta_h = h_h A_h C_{eff} \int (TET-Tcd) dt \quad \text{eq. (13)}$$

If we limit heat ($\theta_h$ lim) that can be transferred during transients from hot gas to metal, when TET is above nominal value, TETlim, we can deduce transient over-temperature turbine limit as follows:

$$\frac{\theta_h \lim}{h_h A_h C_{eff}} = \int (TET - Tcd) dt \quad \text{eq. (14)}$$

$$\overline{\theta_h \lim} = \int \Delta T dt \text{ for } \Delta T \geq \Delta T_{lim} \quad \text{eq. (15)}$$

wherein normalized thermal load $$\overline{\theta_h \lim} = \frac{\theta_h \lim}{h_h A_h C_{eff}} \quad \text{eq. (16)}$$

is proposed as a new limiting parameter. Herein the turbine entry temperature (TET) may at least approximately equal to the combustor exit temperature (CET) which has been determined according to eq. (1) and (2) above.

Using above described algorithm for calculation of the combustor exit temperature (CET), the proposed transient over-temperature control parameter (eq. (16)) has been evaluated for different rapid transients and shown in figure FIG. 4.

Figure 4:
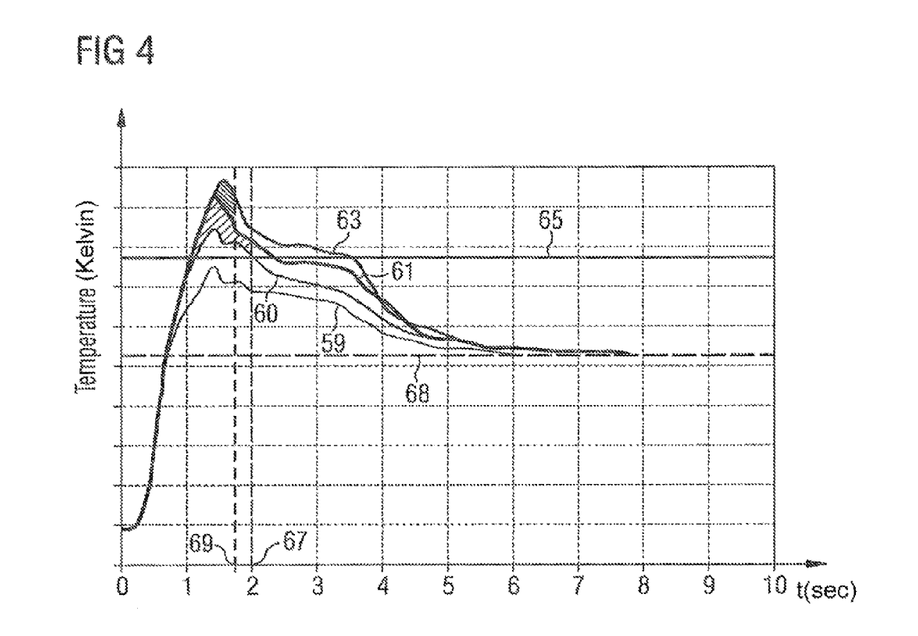
FIG. 4 illustrates a graph illustrating a criterion for controlling a gas turbine according to an embodiment.

FIG. 4 shows a graph for illustrating a method of controlling a gas turbine according to an embodiment. At the x-axis the time is indicated in seconds. At the y-axis a temperature in K (Kelvin) is indicated. Plotted are four curves 59, 60, 61, 63 of a difference of the turbine entry temperature (TET) determined according to eq. (2) and the cooling fluid temperature Tcd. These curves are labelled by reference numbers 59, 60, 61 and 63 and were derived or determined for different operation conditions of the gas turbine 10 illustrated in FIG. 2. The horizontal line 65 corresponds to the value ΔTlim occurring in equation (15) above. According to an embodiment an integral of the difference TET minus Tcd is evaluated if this difference lies above the horizontal line ΔTlim. If this difference TET-Tcd exceeds the horizontal line 65 the integral value will increase with increasing time. Depending on the difference TET-Tcd the integral will assume different values at different times. The curve 61 exhibits a smaller value of the difference TET-Tcd than the curve 63 and thus a predetermined threshold value of the integral will be reached at a time point 67 (2 s) which is later than a time point 69 at which the threshold of the integral is reached for the curve 63 corresponding to different operation conditions. At the time points 67 and 69, respectively, the control unit 44 illustrated in FIG. 2 will control the delivering of fuel to the combustor 24 to be reduced or interrupted in order not to damage the guide vanes 55 of the turbine section 50 of the gas turbine 10. Thereby, damage of these components may be prevented. The horizontal line 68 in FIG. 4 represents the value of normalized continuous running thermal load level which corresponds to the full load conditions.

Transient over-temperature limiting control parameter may represent permissible thermal load to which turbine is subjected during rapid transients. The normalized Thermal Load Inverse Time Limit according to eq. (15) and (16) is based on the integration of the normalized thermal load in excess of the maximum normalized thermal load level limit with the time that the temperature has been exceeding the threshold limit. Thus, the time allowed before action is taken is inversely dependant on the normalized thermal load excess.

The invention claimed is:
1. A method of determining an exit temperature of a gas exiting a combustor of a gas turbine for use in controlling the gas turbine, the method comprising:
 determining a mass flow and a temperature of fuel being delivered to the combustor through calculation, the determining the mass flow of fuel being delivered to the combustor being at least partially based on measurements from gas turbine instrumentation;
 determining a mass flow and a temperature of air being delivered to the combustor, the determining of the mass flow of air being based on calculations comprising:

determining a mass flow of the gas exiting the combustor through a calculated estimation using measurements from the gas turbine instrumentation,
the determined mass flow of fuel being delivered to the combustor;
determining a temperature dependence of an approximation of a specific heat capacity of the gas exiting the combustor; and
determining a separate predetermined start exit temperature of the gas exiting the combustor based on:
the determined mass flow and temperature of fuel being delivered to the combustor,
the determined mass flow and temperature of air being delivered to the combustor,
the determined temperature dependence of the approximation of the specific heat capacity of the gas exiting the combustor;
wherein the determining of the exit temperature of the gas exiting the combustor comprises establishing an iteration equation and applying the iteration equation to at least the separate predetermined start exit temperature to obtain an initial calculated exit temperature,
wherein the determining the exit temperature of the gas exiting the combustor further comprises defining an interation threshold and iteratively applying the iteration equation to repeatedly obtain a subsequent calculated exit temperature from a previous initial calculated exit temperature,
wherein the iteratively applying the iteration equation is stopped if a difference between the subsequent calculated exit temperature and the previous initial calculated exit temperature is smaller than the iteration threshold,
wherein a final subsequent calculated exit temperature is obtained from a final iteration of the iteratively applying the iteration equation after stopping the iteratively applying the iteration equation, and
wherein the exit temperature of the gas exiting the combustor is the final subsequent calculated exit temperature; and
performing a first mathematical integration of a first difference between the exit temperature of the gas exiting the combustor and a predetermined threshold temperature over a time interval, if the first difference is greater than zero, thereby obtaining a first integral value; and
cooling the turbine section with a cooling fluid having a cooling fluid temperature; and
performing a second mathematical integration of a second difference between the determined combustor exit temperature and a sum of the cooling fluid temperature and a difference threshold over a time interval, if the second difference is greater than zero, thereby obtaining a second integral value; and
controlling the gas turbine based on the first and second integral values by at least one of:
modifying delivery of fuel and/or air to the combustor and maintaining delivery of fuel and/or air to the combustor.

2. The method according to claim 1, wherein the determining the temperature dependence of the specific heat capacity of the gas exiting the combustor comprises approximating the specific heat capacity of the gas exiting the combustor through calculation.

3. The method according to claim 2, wherein said approximating the specific heat capacity of the gas exiting the combustor through calculation comprises approximating the specific heat capacity by a polynomial.

4. The method according to claim 1, wherein the determining the mass flow and the temperature of the fuel delivered to the combustor comprises:
detecting a state of a valve controlling delivering the fuel to the combustor; and/or measuring the temperature of the fuel.

5. The method according to claim 1, wherein the determining the temperature of air being delivered to the combustor comprises measuring the temperature of air being delivered to the combustor.

6. The method according to claim 1, wherein the modifying delivery of fuel and/or delivery of air to the combustor comprises either reducing delivery of fuel and/or delivery of air to the combustor or shutting down the gas turbine if the first integral value is greater than a first threshold and/or if the second integral value is greater than a second threshold.

7. The method according to claim 6, wherein the modifying delivery of fuel and/or delivery of air to the combustor comprises maintaining delivery of fuel and/or delivery of air to the combustor at an unchanged rate when the first integral value is smaller than or equal to the first threshold and/or when the second integral value is smaller than or equal to the second threshold and when the exit temperature of the gas exiting the combustor is greater than the predetermined threshold temperature.

* * * * *